United States Patent
Lim et al.

(10) Patent No.: US 7,992,894 B2
(45) Date of Patent: Aug. 9, 2011

(54) SIDE AIRBAG UNIT FOR VEHICLES

(75) Inventors: Chang Hyun Lim, Bucheon-si (KR); Dae Young Kwak, Yongin-si (KR); Tae Ik Kwon, Hwaseong-si (KR); Soon Bok Lee, Hwaseong-si (KR); Anders Palo, Gothenburg (SE)

(73) Assignees: Hyundai Motor Company, Seoul (KR); Kia Motors Corporation, Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 12/621,797

(22) Filed: Nov. 19, 2009

(65) Prior Publication Data
US 2011/0025027 A1 Feb. 3, 2011

(30) Foreign Application Priority Data
Jul. 31, 2009 (KR) .................. 10-2009-0070599

(51) Int. Cl.
*B60R 21/16* (2006.01)
(52) U.S. Cl. .................. 280/730.2; 280/743.2
(58) Field of Classification Search ............... 280/730.2, 280/743.1, 743.2
See application file for complete search history.

(56) References Cited

U.S. PATENT DOCUMENTS

| | | | | |
|---|---|---|---|---|
| 5,636,862 A | * | 6/1997 | Cheung et al. | 280/730.2 |
| 5,765,867 A | * | 6/1998 | French | 280/743.2 |
| 5,924,722 A | * | 7/1999 | Koide et al. | 280/730.2 |
| 6,270,113 B1 | * | 8/2001 | Wipasuramonton et al. | 280/730.2 |
| 7,798,519 B2 | * | 9/2010 | Kawabe et al. | 280/728.3 |
| 2006/0232054 A1 | * | 10/2006 | Schlosser et al. | 280/743.2 |

* cited by examiner

*Primary Examiner* — Paul N Dickson
*Assistant Examiner* — Robert A Coker
(74) *Attorney, Agent, or Firm* — Morgan, Lewis & Bockius LLP

(57) ABSTRACT

A side airbag unit for a vehicle, constructed to protect a side of a passenger in the event of a side collision or when the vehicle overturns, the side airbag unit may include an airbag module having a stud which is inserted into a predetermined portion of a seat frame, and an airbag cushion which remains folded in the airbag module and expands when the airbag unit is deployed, and a strap allowing the airbag cushion to be deployed to a predetermined length at a predetermined position when the airbag cushion expands, wherein a first end of the strap is coupled to a predetermined portion of the airbag cushion and a second end thereof is coupled to the stud such that the second end of the strap is being locked to the stud when the stud is assembled with the seat frame.

8 Claims, 6 Drawing Sheets

SIDE AIRBAG UNIT FOR VEHICLES

CROSS-REFERENCE TO RELATED APPLICATION

The present application claims priority to Korean Patent Application Number 10-2009-0070599 filed on Jul. 31, 2009, the entire contents of which application is incorporated herein for all purpose by this reference.

BACKGROUND OF THE INVENTION

1. Field of the Invention

The present invention relates to a side airbag unit for a vehicle, which is constructed so that a strap is locked when an airbag module is assembled with a seat frame.

2. Description of Related Art

Generally, an airbag system is a safety device which includes an impact sensor, an airbag module and an airbag control unit, and causes an airbag cushion received in the airbag module to be expanded by gas in the event of a collision, thus protecting a driver or a passenger from shocks.

The airbag system was mainly developed to provide safety in the case of a head-on collision between vehicles. Recently, a side airbag has been developed to provide safety in the case of a side collision or a vehicle rolling over.

After an inflator received in the airbag module generates gas as a result of an explosion, it takes about 5 ms to inject the gas into the airbag cushion. It takes about 30 ms for the airbag cushion to expand.

When a driver or passenger moves in the direction where an object with which impact can be made is located, the expanded airbag cushion absorbs the shock, so that injuries are reduced. It generally takes about 40 to 60 ms to absorb the shock after a collision.

Finally, the driver or passenger returns to his or her original position by the restorative force of the airbag cushion, and the gas is slowly discharged from the airbag cushion. It usually takes about 120 to 135 ms to perform this process.

Especially, since a side airbag is mounted to a side of a seat so that the airbag module is located between the seat and a door or between a driver's seat and a passenger seat, the flank or head of a person sitting in the seat can be protected when the airbag cushion is deployed.

The side airbag is provided with a strap which restrains the airbag cushion such that it is always deployed to a predetermined length at a predetermined position when the airbag cushion folded in the airbag module is deployed. Here, one end of the strap is secured to a side portion of the airbag cushion.

However, since the other end of the strap is secured to a side portion of the seat, an additional operation of attaching the other end of the strap to the seat is required when the airbag module is mounted to a side of the seat, so that the number of assembling processes and an assembling period are undesirably increased.

Further, when the side airbag is placed between the driver's seat and the passenger seat, a lateral force acts on the airbag cushion which is deployed in the longitudinal direction of a vehicle body, and the airbag cushion does not sufficiently support passengers, so that they may collide with each other secondarily.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a side airbag unit for a vehicle, which is constructed so that a strap is locked when an airbag module is mounted to a side of a seat, thus simplifying the assembling process of the side airbag, and shortening an assembly period and to provide a side airbag unit for a vehicle, which increases lateral support force of a deployed airbag cushion, so that the airbag cushion is not pushed but is sufficiently supported even if a passenger exerts lateral force to the airbag cushion, thus preventing passengers from colliding with each other.

In an aspect of the present invention, the side airbag unit for a vehicle, constructed to protect a side of a passenger in the event of a side collision or when the vehicle overturns, the side airbag unit may include an airbag module having a stud which is inserted into a predetermined portion of a seat frame, and an airbag cushion which remains folded in the airbag module and expands when the airbag unit is deployed, and a strap allowing the airbag cushion to be deployed to a predetermined length at a predetermined position when the airbag cushion expands, wherein a first end of the strap is coupled to a predetermined portion of the airbag cushion and a second end thereof is coupled to the stud such that the second end of the strap is being locked to the stud when the stud is assembled with the seat frame.

The airbag module may include the airbag cushion, a housing installed in the airbag cushion and coupled to the stud in such a way that a portion of the stud protrudes out of the airbag cushion, an inflator accommodated in the housing, and a cover for retaining the airbag cushion, wherein the first end of the strap is coupled to the airbag cushion through the cover.

A support member may be disposed between the strap and the airbag module and supports the expanded airbag cushion to prevent the expanded airbag cushion from being pushed laterally, a first end of the support member being secured to the stud, wherein the support member extends from the stud in a forward direction of the vehicle with a predetermined length.

The predetermined length of the support member may be shorter than the predetermined length of the deployed airbag cushion in the forward direction of the vehicle.

The support member may include a bent portion which is bent at a second end of the support member in a direction opposite to the airbag cushion, wherein the bent portion of the support member is aligned along a traverse direction of the vehicle.

A mounting hole corresponding to an outer diameter of the stud may be formed in the second end of the strap.

A locking ring may be mounted to the portion of the stud to prevent removal of the strap.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the preferred embodiments of the present invention will be described in detail with reference to the accompanying drawings.

Figure 1:
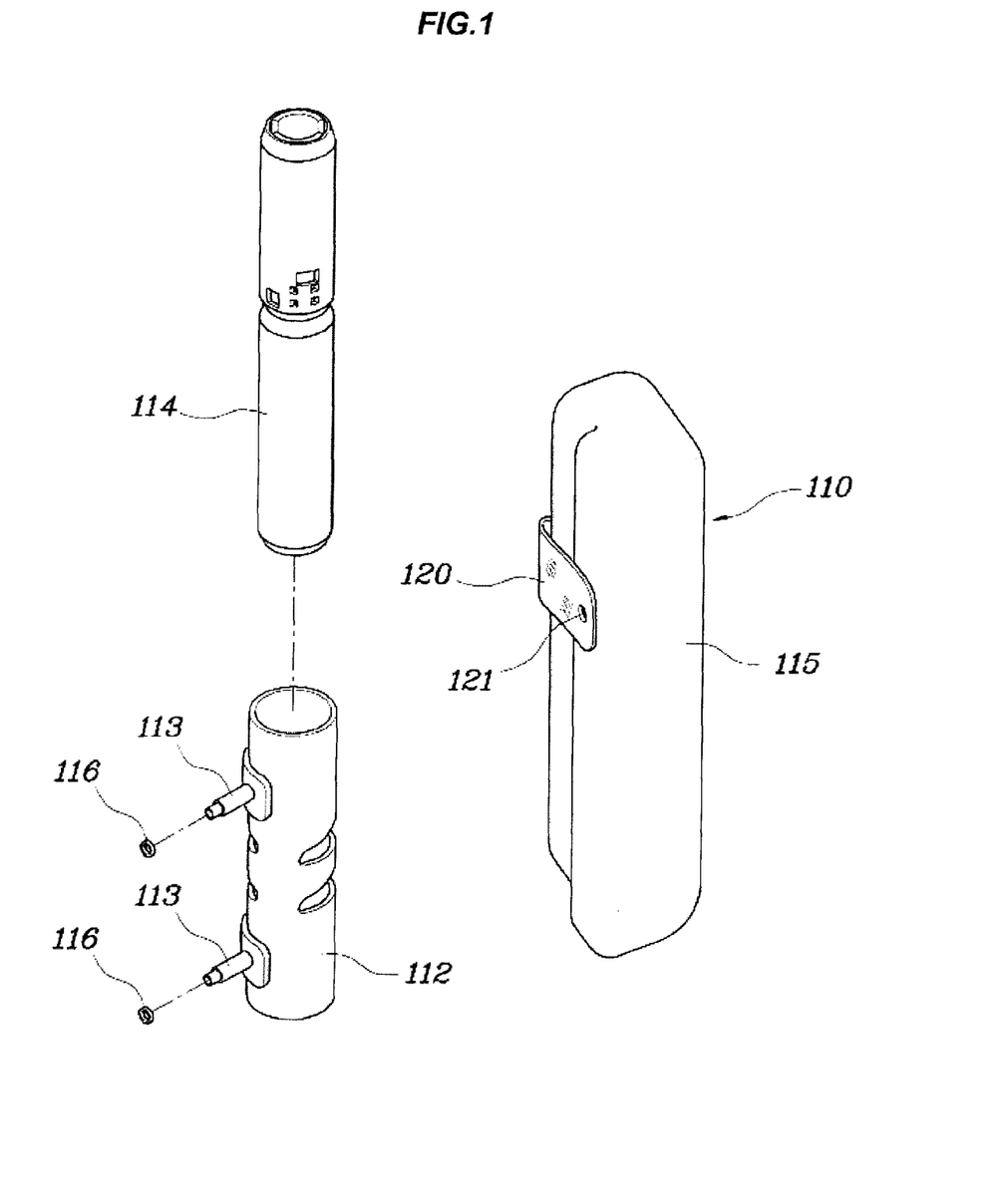
FIG. 1 is an exploded perspective view illustrating the construction of a side airbag unit according to the first embodiment of the present invention.
Figure 2:
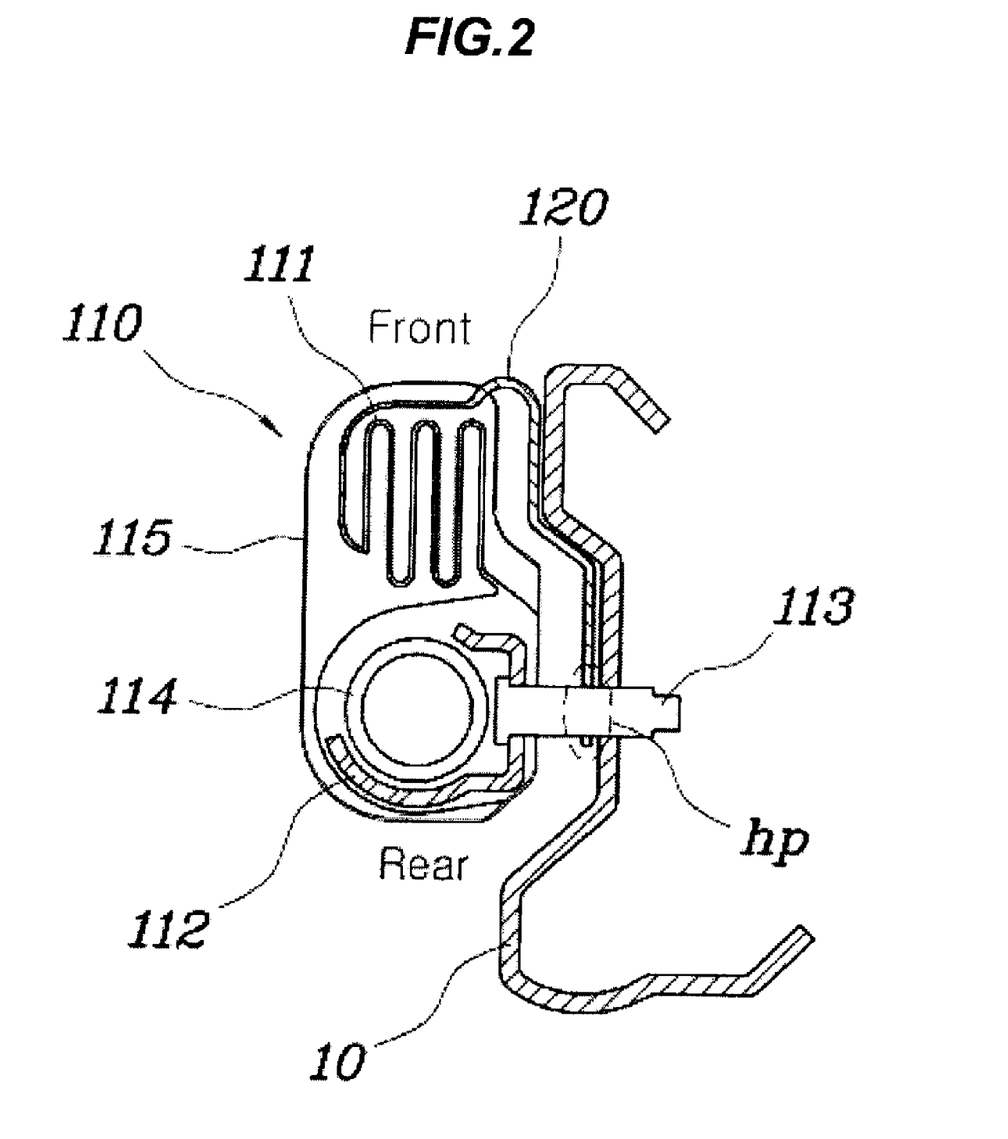
FIG. 2 is a schematic plan sectional view illustrating the non-deployed state of the side airbag unit according to the first embodiment of the present invention.
Figure 3:
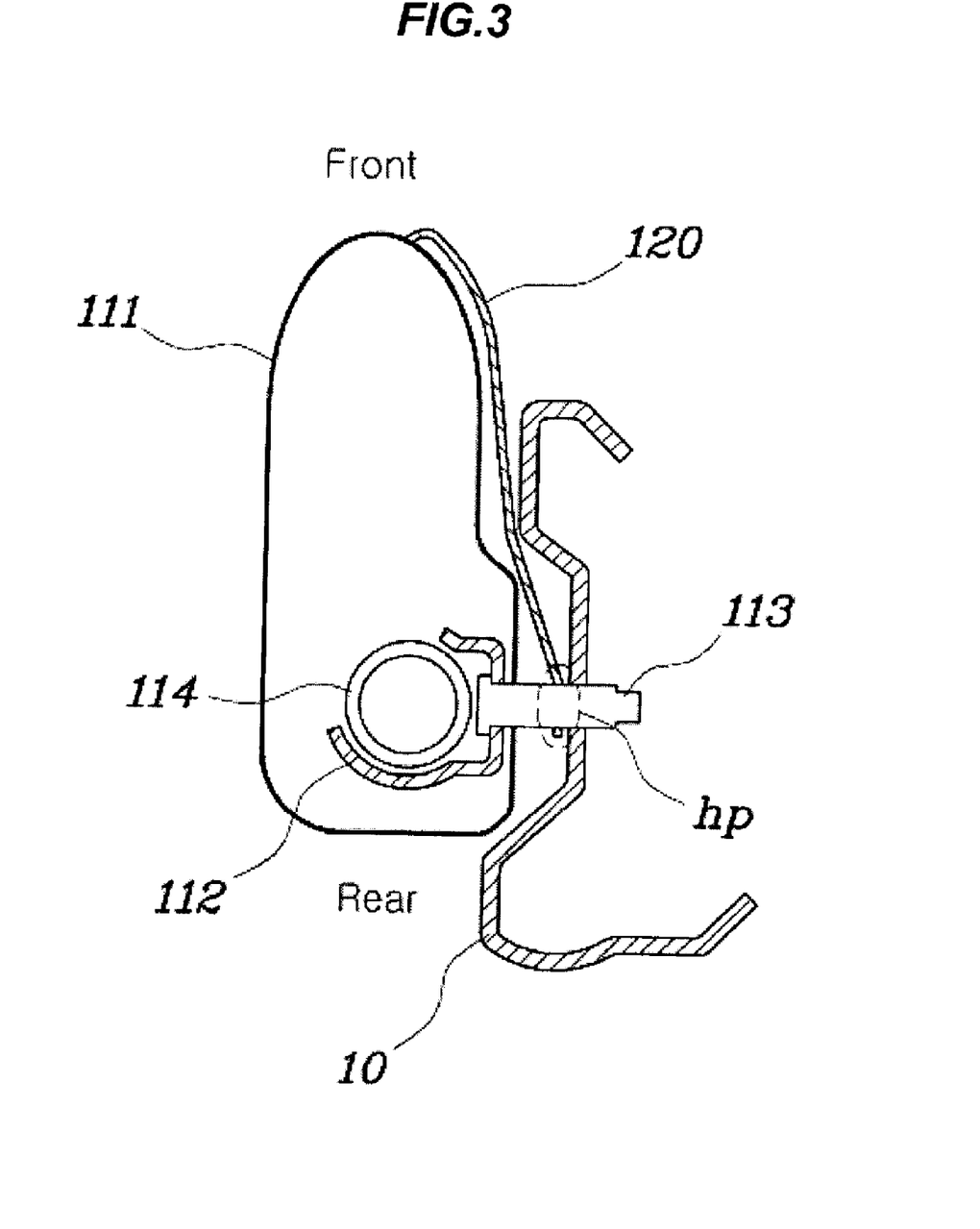
FIG. 3 is a schematic plan sectional view illustrating the deployed state of the side airbag unit of FIG. 2.

FIGS. 1 to 3 illustrate a side airbag unit according to the first embodiment of the present invention. FIG. 1 is an exploded perspective view illustrating the construction of a side airbag unit according to the first embodiment of the present invention, FIG. 2 is a schematic plan sectional view illustrating the non-deployed state of the side airbag unit according to the first embodiment of the present invention, and FIG. 3 is a schematic plan sectional view illustrating the deployed state of the side airbag unit of FIG. 2

As shown in FIGS. 1 to 3, exemplary embodiments of the present invention are directed to a side airbag unit for a vehicle, which protects a side of a passenger from a side collision or when a vehicle overturns, thus preventing the passenger from colliding with a door or another passenger.

According to the first embodiment of the present invention, the side airbag unit includes an airbag module 110 and a strap 120. The airbag module 110 is provided with a stud 113 which is inserted into a side portion of a seat frame 10. An airbag cushion 111 which is normally folded but expands when the airbag is deployed is accommodated in the airbag module 110.

That is, the stud 113 is provided on a predetermined portion of the airbag module 110 in such a way as to protrude to a predetermined length, and is used to mount the airbag module 110 to a side of the seat. The stud 113 is inserted into the side portion of the seat frame 10 to be assembled with the seat frame 10. According to this embodiment, the stud 113 is provided on the rear portion of the airbag module 110.

Here, the airbag module 110 includes the airbag cushion 111, a housing 112 installed in the airbag cushion 111, an inflator 114 accommodated in the housing 112, and a cover 115 covering the airbag cushion 111. The housing 112 and the inflator 114 are received in the airbag module 110. However, in FIG. 1, the housing 112 and the inflator 114 are exposed to the outside to clearly show the construction of the housing 112 and the inflator 114.

As stated above, the stud 113 is provided on the airbag module 110. In detail, the stud 113 is provided on a predetermined portion of the housing 112 provided in the airbag module 110. Part of the stud 113 protrudes out of the airbag cushion 111, so that an end of the stud 113 is exposed to the outside of the airbag module 110.

In order to help this invention be understood, all of the parts accommodated in the airbag module 110 are not shown in the drawings, but only the necessary parts are shown succinctly to describe the present invention. Although not shown in the drawings, general parts required to operate an airbag are included.

Here, the inflator 114 is the device which generates gas as the result of an explosion. The airbag cushion 111 is the device which is constructed to be deployed and expanded by gas supplied from the inflator 114. When the airbag cushion 111 expands, the cover 115 is destroyed by the expansive force, so that the airbag cushion 111 is deployed to the outside. The cover 115 is made of fabric or synthetic resin which covers the airbag cushion 111 and is easily destroyed when the airbag cushion 111 expands. The cover 115 is not limited to a specific material.

The airbag module 110 may be installed on at least one of both sides of the seat frame 10 (the left and right sides of a passenger). In order to prevent a passenger from colliding with a door, the airbag module 110 may be installed to a side of the seat frame 10 facing the door. Further, in order to prevent passengers from colliding with each other, the airbag module 110 may be installed to a side of the seat frame 10 facing a neighboring seat.

Meanwhile, when the airbag cushion 111 expands, so that it is deployed from the side of the seat in the longitudinal direction of the vehicle, the strap 120 guides the expanded airbag cushion 111 to allow it to always have a predetermined length and be always located at a predetermined position. One end of the strap 120 is coupled to a side portion of the airbag cushion 111. Here, the strap 120 passes through the cover 115 of the airbag module 110 to be coupled to the airbag cushion 111 which is provided inside the cover 115.

Further, in order to expand the airbag cushion 111 to a predetermined location when the airbag cushion 111 expands, the other end of the strap 120 must be fixed. The other end of the strap 120 is placed on the stud 113.

Before the stud 113 is assembled with the seat frame 10, it is not necessary to couple the other end of the strap 120 to the stud 113. The other end of the strap 120 may be pre-fastened to the stud 113. That is, a mounting hole 121 corresponding to the outer diameter of the stud 113 is formed in the other end of the strap 120. The mounting hole 121 is then fitted over the stud 113.

In this state, when the stud 113 of the airbag module 110 is assembled with the seat frame 10, the other end of the strap 120 which is placed on the stud 113 is also locked. It is unnecessary to additionally lock the other end of the strap 120.

However, more preferably, in order to prevent the strap 120 from being removed from the stud 113, a locking ring 116 is fitted over the stud 113 to which the strap 120 is coupled.

If a locking ring 116 is not used, the strap 120 may be removed from the stud 113 when the airbag module 110 is moved, so that the strap 120 must be coupled to the stud 113 again, thus inconveniencing a worker.

According to this embodiment, when the airbag cushion 111 is deployed, one end of the strap 120 is secured to any one place of the airbag cushion 111 and the expanding volume of the airbag cushion 111 is fixed. Thus, the strap 120 is extended by the airbag cushion 111 which is expanded as shown in FIG. 3 and restrains the airbag cushion 111 such that the airbag cushion 111 is always deployed to a predetermined length at a predetermined position.

Figure 4:
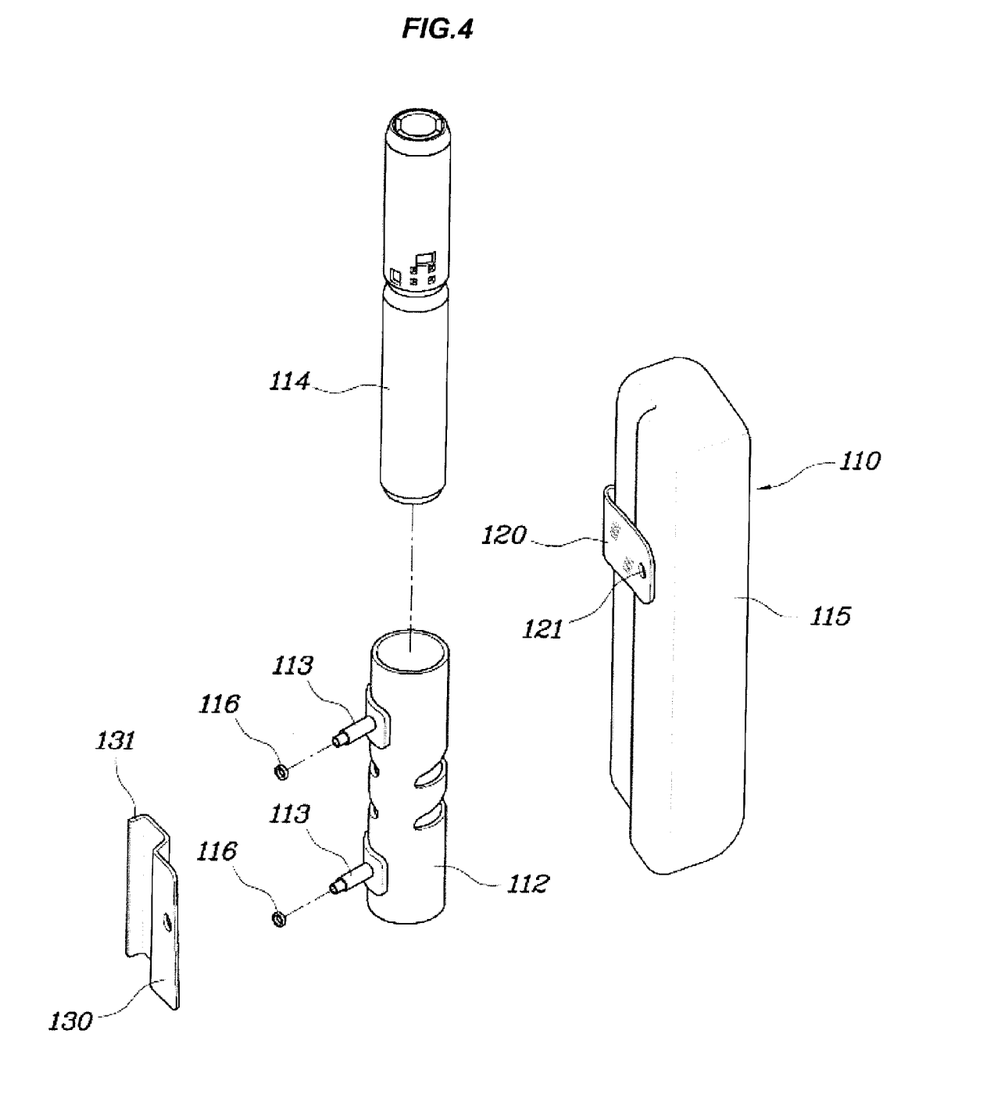
FIG. 4 is an exploded perspective view illustrating the construction of a side airbag unit according to the second embodiment of the present invention.
Figure 5:
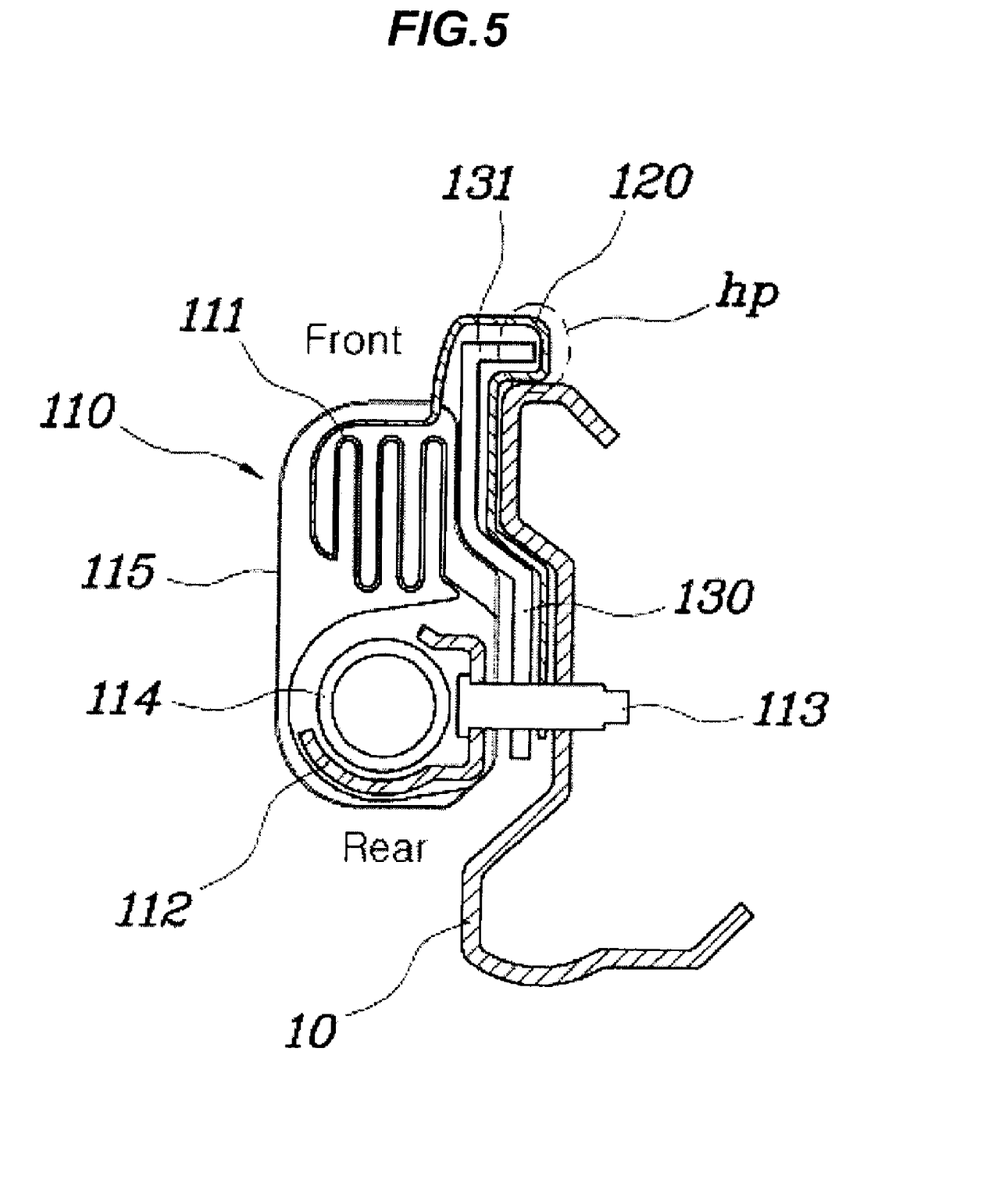
FIG. 5 is a schematic plan sectional view illustrating the non-deployed state of the side airbag unit according to the second embodiment of the present invention.
Figure 6:
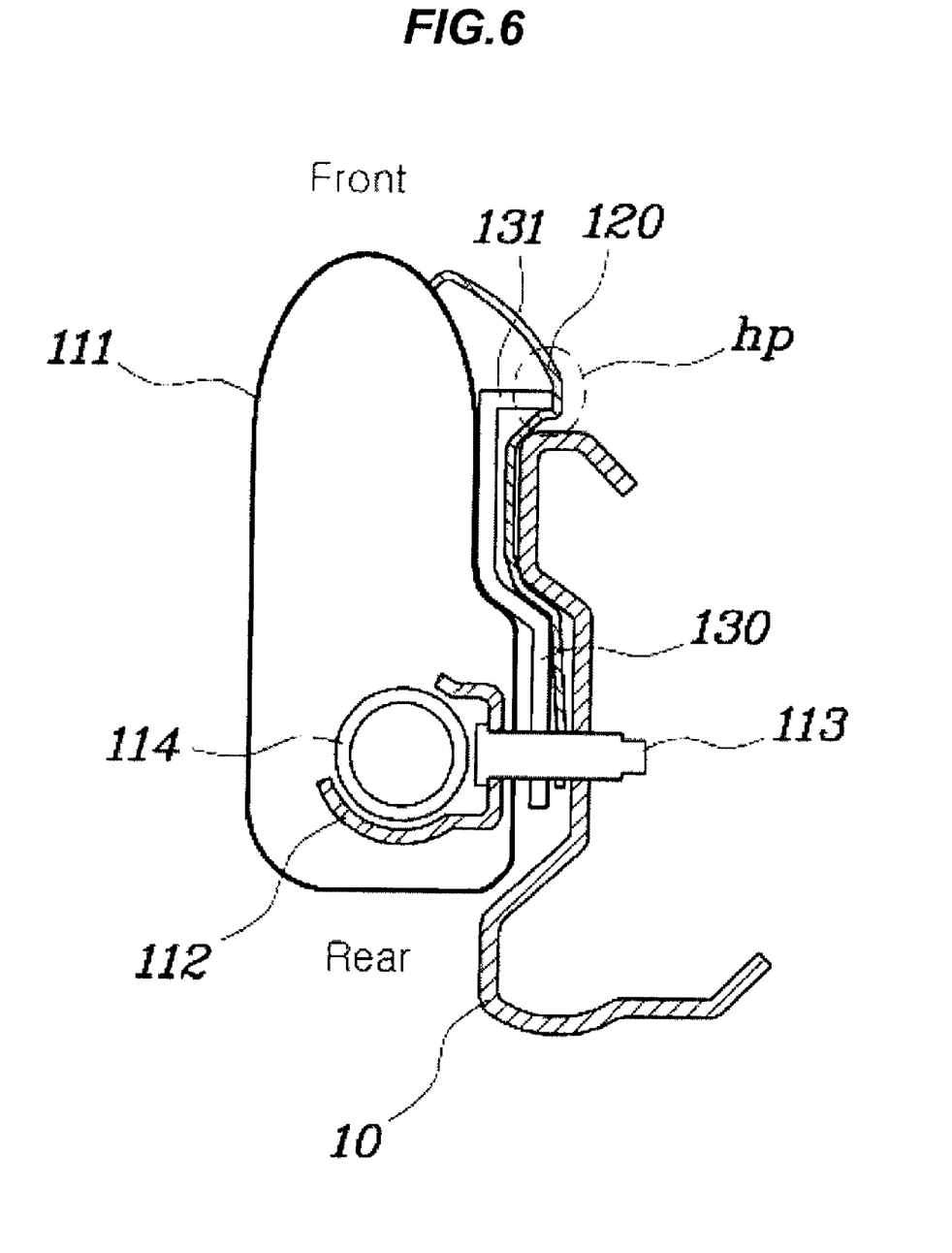
FIG. 6 is a schematic plan sectional view illustrating the deployed state of the side airbag unit of FIG. 5.

Meanwhile, FIGS. 4 to 6 illustrate a side airbag unit according to the second embodiment of the present invention. FIG. 4 is an exploded perspective view illustrating the construction of a side airbag unit according to the second embodiment of the present invention, FIG. 5 is a schematic plan sectional view illustrating the non-deployed state of the side airbag unit according to the second embodiment of the present invention, and FIG. 6 is a schematic plan sectional view illustrating the deployed state of the side airbag unit of FIG. 5.

As shown in FIGS. 4 to 6, a general construction of the second embodiment of the present invention remains the same as that of the first embodiment. Unlike the first embodiment, the side airbag unit of the second embodiment further includes a support member 130 which supports the airbag cushion 111 so that it is not pushed laterally.

The support member 130 is provided between the strap 120 and the airbag module 110 in such a way as to be placed around the stud 113. One end of the support member 130 is secured to the stud 113.

According to the first embodiment having no support member 130, the hinge point hp of the strap 120 is located at the stud 113, so that the airbag cushion 111 cannot stably support a passenger who is pushed laterally in the event of a side collision or when overturned, and thus the passenger's head may collide with the door or the passenger may collide with another passenger.

Therefore, in order to prevent the airbag cushion 111 from being pushed even if a lateral external force acts on the airbag cushion 111, it is preferable that the hinge point be close to the one end of the strap 120 which is secured to the airbag cushion 111. To this end, as shown in FIGS. 5 and 6, the support member 130 is placed between the strap 120 and the airbag module 110 to allow the hinge point hp to be close to the one end of the strap 120 which is secured to the airbag cushion 111. One end of the support member 130 is secured to the stud 113.

In this state, if the airbag cushion 111 accommodated in the airbag module 110 is expanded, the strap 120 is extended as shown in FIG. 6. At this time, the hinge point hp of the strap 120 is not located at the stud 113 but is located at an end of the support member 130 which is close to one end of the strap 120, because of the support member 130.

The hinge point hp is a support point at which the strap 120 is supported when one end of the strap 120 is pulled. The strap 120 is interfered with by the end of the support member 130 which is close to one end of the strap 120, thus realizing a locking effect. Therefore, even if a lateral force acts on the airbag cushion 111, one end of the strap 120 is locked, thus preventing the airbag cushion 111 from being pushed.

The support member 130 may be in the shape of a straight-line. However, as shown in FIGS. 5 and 6, the support member 130 preferably has a bent portion 131 which is bent in a direction opposite to the airbag cushion 111, thus allowing the strap 120 to be more efficiently locked.

As described above, the present invention provides a side airbag unit for a vehicle, in which an end of a strap is locked when an airbag module is assembled with a seat frame, so that an additional strap locking operation is not required, thus reducing the process and time used to lock the strap.

Further, the present invention provides a side airbag unit for a vehicle, in which a lateral support force of a deployed side airbag is increased, so that passengers are not pushed leftwards or rightwards in the event of a side collision or when a vehicle overturns, thus preventing secondary collision, in addition to preventing the passengers from colliding with each other.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side airbag unit for a vehicle, constructed to protect a side of a passenger in the event of a side collision or when the vehicle overturns, the side airbag unit comprising:
   an airbag module having a stud which is inserted into a predetermined portion of a seat frame, and an airbag cushion which remains folded in the airbag module and expands when the airbag unit is deployed; and
   a strap allowing the airbag cushion to be deployed to a predetermined length at a predetermined position when the airbag cushion expands, wherein a first end of the strap is coupled to a predetermined portion of the airbag cushion and a second end thereof is coupled to the stud such that the second end of the strap is being locked to the stud when the stud is assembled with the seat frame;
   wherein the airbag module comprises:
      the airbag cushion;
      a housing installed in the airbag cushion and coupled to the stud in such a way that a portion of the stud protrudes out of the airbag cushion;
      an inflator accommodated in the housing; and
      a cover for retaining the airbag cushion, wherein the first end of the strap is coupled to the airbag cushion through the cover.

2. The side airbag unit as set forth in claim 1, wherein a support member is disposed between the strap and the airbag module and supports the expanded airbag cushion to prevent the expanded airbag cushion from being pushed laterally, a first end of the support member being secured to the stud.

3. The side airbag unit as set forth in claim 2, wherein the support member extends from the stud in a forward direction of the vehicle with a predetermined length.

4. The side airbag unit as set forth in claim 3, wherein the predetermined length of the support member is shorter than the predetermined length of the deployed airbag cushion in the forward direction of the vehicle.

5. The side airbag unit as set forth in claim 2, wherein the support member comprises a bent portion which is bent at a second end of the support member in a direction opposite to the airbag cushion.

6. The side airbag unit as set forth in claim 5, wherein the bent portion of the support member is aligned along a traverse direction of the vehicle.

7. The side airbag unit as set forth in claim 1, wherein a mounting hole corresponding to an outer diameter of the stud is formed in the second end of the strap.

8. The side airbag unit as set forth in claim 1, wherein a locking ring is mounted to the portion of the stud to prevent removal of the strap.

* * * * *